March 20, 1934.    G. S. BINCKLEY    1,951,897
PRESSURE RELIEF DEVICE
Filed Nov. 25, 1930    2 Sheets-Sheet 1
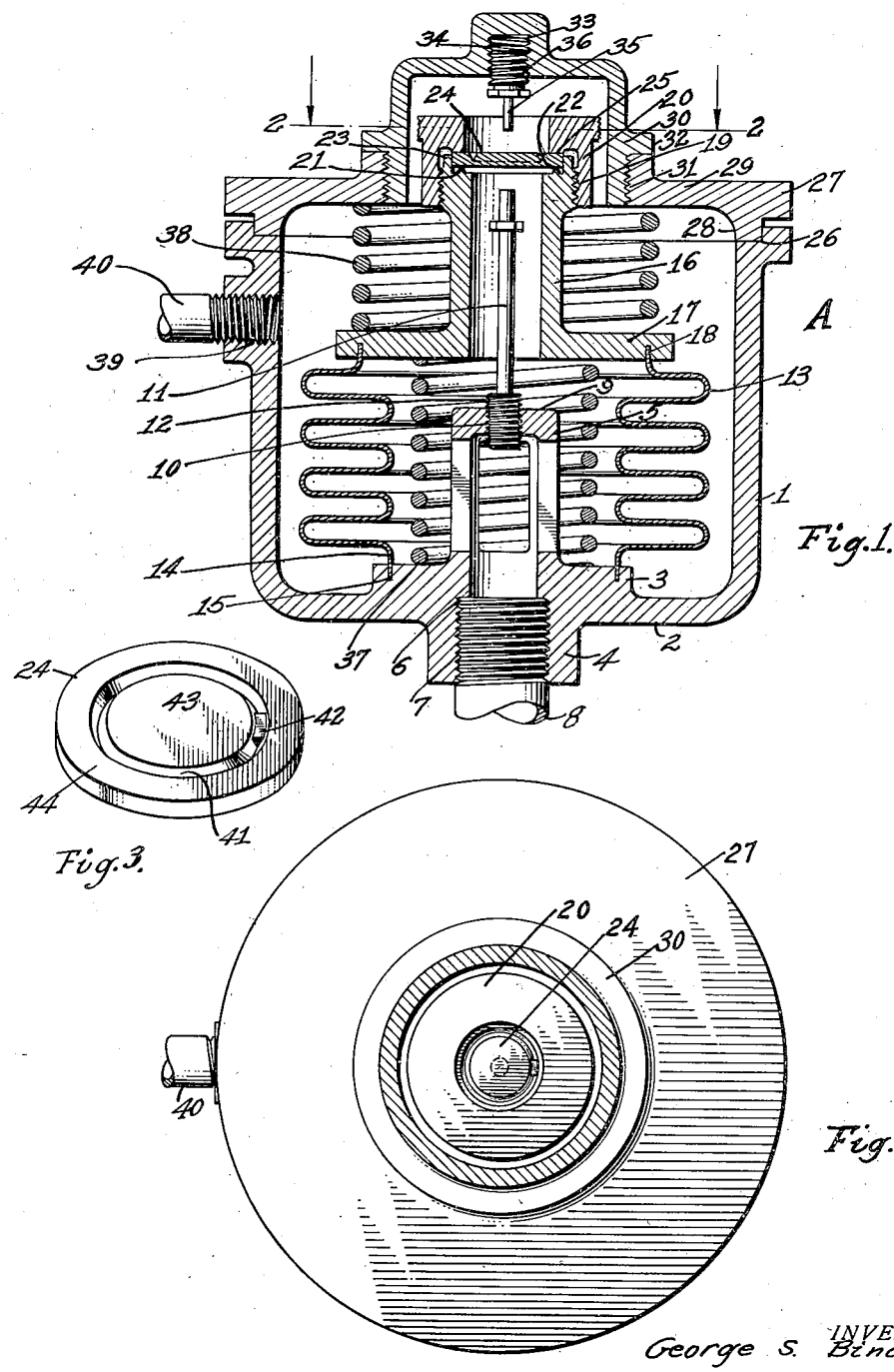

March 20, 1934.　　　G. S. BINCKLEY　　　1,951,897

PRESSURE RELIEF DEVICE

Filed Nov. 25, 1930　　　2 Sheets-Sheet 2

INVENTOR,
George S. Binckley;
BY Calvin Brown,
ATTORNEY

Patented Mar. 20, 1934

1,951,897

UNITED STATES PATENT OFFICE 1,951,897

PRESSURE RELIEF DEVICE

George S. Binckley, Los Angeles, Calif.

Application November 25, 1930, Serial No. 498,089

5 Claims. (Cl. 220—89)

This invention relates to pressure relief devices, and has for an object the provision of means adapted to relieve pressure in a line when it exceeds a predetermined maximum.

The invention is adaptable for fluids of all characters, such as gas or liquid. In one embodiment of the invention, excess pressure is relieved to the atmosphere, and in another embodiment incorporating the same invention, I may equalize pressures on both sides of the line. The device may be interposed in a by-pass line.

A further object of the invention is the provision of means whereby fluid pressure within a closed system of chambers or ducts may be restricted to a defined maximum or the difference of pressure between any parts of said closed system may be restricted to any desired maximum value.

Another object consists in the provision of means of the character stated whereby various elements entering into the construction of said means may be readily assembled and easily balanced as to the pressure to be withstood by certain of the elements.

Another object is the provision of a member adapted to be broken under excess pressure, which member is so arranged that the same will not, in any way, interfere with any of the movable parts of the mechanism after such breakage.

A further object of the invention consists in a device of the character stated which is simple of construction, inexpensive of manufacture, foolproof in operation, and generally superior to devices adapted to perform a like function.

With the above mentioned and other objects in view, the invention consists in the novel and useful provision, formation, construction, association and relative arrangement of parts, members and features, all as shown in certain embodiments in the accompanying drawings, described generally, and more particularly pointed out in the claims.

In the drawings:

Figure 1 is a transverse sectional view of one form of the invention,

Figure 2 is a sectional view on the line 2—2 of Figure 1,

Figure 3 is a perspective view of a member incorporated within the invention,

Figure 4:
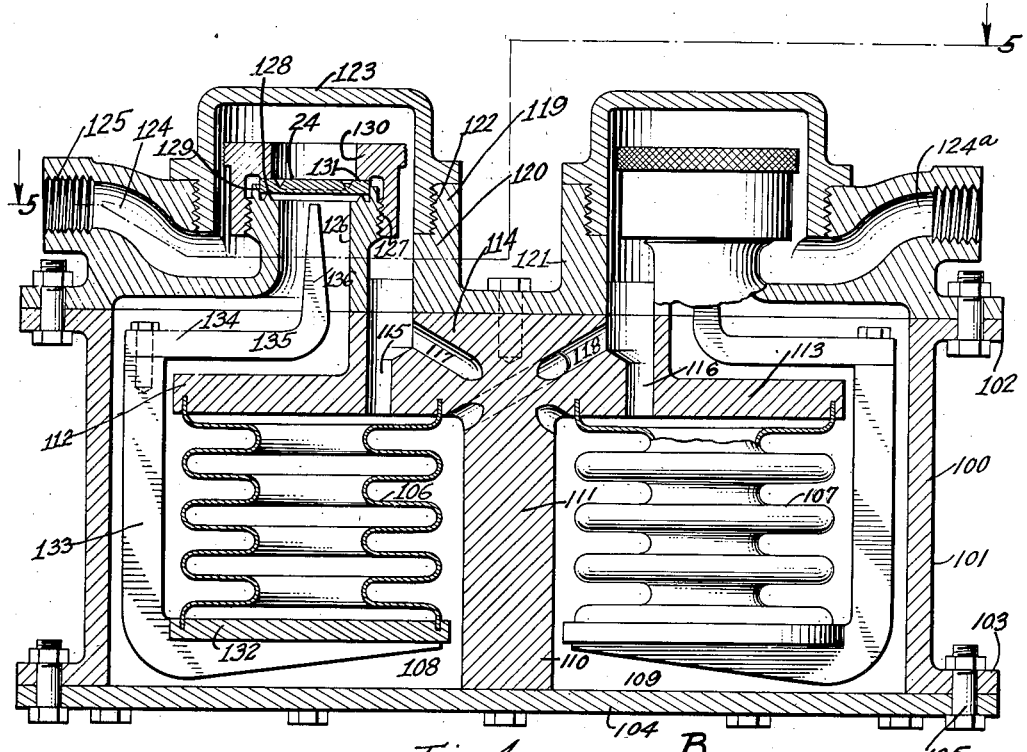
Figure 4 is a transverse sectional view of a modified form of the invention, and, Figure 5 is a sectional view on the line 5—5 of Figure 4.
Figure 5:
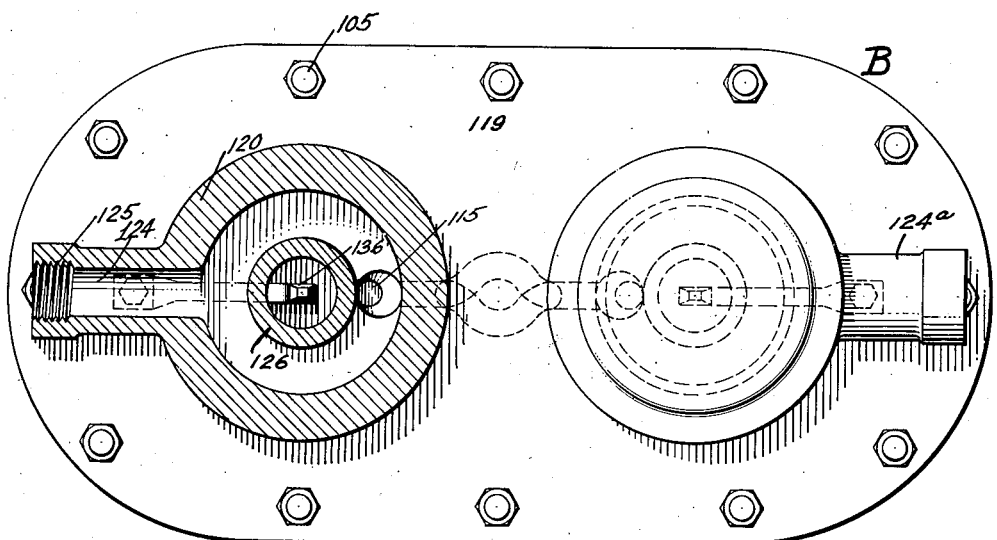

The form of the invention which I have shown in Figures 1 and 2 is designated as an entirety by A, and that form shown in Figures 4 and 5 by B. The form A will first be described. This form includes a casing 1, the base 2 of which is provided with interior and exterior bosses 3 and 4. In addition, the boss 3 carries what may be termed a cage or support 5 which is centrally positioned within the casing. Furthermore, a central bore 6 is formed in the enlarged parts of the base, and the wall bounding the bore 6 is threaded at 7 whereby a pipe or tube, such as shown at 8, may be screw-threaded thereto. The so-called cage 5 may comprise one or more spaced apart uprights with a top member 9 supported by said uprights and centrally bored and screw-threaded at 10. An elongated pin or stem 11 carries a screw-threaded member 12 which may be adjustably threaded to the threads 10. Within the casing and secured to the enlargement 3 is a bellows 13. The bellows may be formed of any material desired, such as metal, and it will be noted that one end 14 of the said bellows is anchored within an annular groove 15 of the enlargement. At 16, I have provided an annular member carrying at one end an annular flange 17. This annular flange is formed with an annular groove 18, within which groove the opposite end of said bellows is anchored. This member 16 is screw-threaded at 19 to receive an external cap-type nut 20. Furthermore, the end 21 of the member 16 is formed with an annular knife edge 22 and with an annular flange 23. Means 24, to be hereinafter described, is received within the confines of the annular flange 23 and rests upon the annular knife edge 21. The cap nut 20 is then screw-threaded to the threads 19 and has an annular foot portion 25 bearing against the means 24 whereby the said means is held between the knife edge and foot.

The casing 1 is formed with an annular shoulder 26 and a cap 27 provided with an annular flange 28 is received within the confines of the annular shoulder. This cap is in two parts, as shown at 29 and 30, and which parts are screw-threaded together as shown at 31 whereby the part 30 may be disconnected from the part 29. To this end, the part 30 is annularly flanged at 32 for abutment against a portion of the part 29. The part 30 is centrally enlarged at 33 and formed with a screw-threaded bore 34. A pin 35 formed with a screw-threaded part 36 is in screw-threaded engagement with the threaded bore 34. It will be noted that the pins 11 and 35 are in axial alignment.

In one embodiment of the invention, I may place a coil spring 37 between the boss 3 and the flange 17 and likewise, I may interpose a coil spring 38 between the flange 27 and the cap 29. When I utilize this construction, I may use bellows formed of a material other than metal or material that does not have inherent resiliency. The casing is enlarged and formed with a screw-threaded bore at 39. A tube or pipe 40 is screw-threaded to the threaded bore 39.

The disc 24 may be formed of metal, such as lead, and a surface thereof is provided with an annular groove 41. The groove, however, is interrupted at 42, and at this zone, the lead or other metal is retained. More particularly, the interrupted part acts as a hinge for the central portion 43 of the disc when the same is broken from the remaining portion 44 of said disc. Obviously, the part 43 acts as a valve and the part 42 as the hinge for the said valve. This construction prevents the central portion of the disc from falling within the member 16.

The form of the invention illustrated in Figures 4 and 5 embodies what may be termed a double form of by-pass. As before, I provide a casing 100 having a side wall member 101 provided with top and bottom flanges 102 and 103, to which flange 103 is secured a base 104. The present securing means includes a plurality of spaced bolts 105. Within the said casing are a pair of bellows 106 and 107, and said bellows are maintained in separate chambers or compartments 108 and 109 of the casing by means 110 constituting a central partition wall or standard 111 secured to the base and sides of the casing. This partition wall 111 is provided with a pair of flanges 112 and 113, for reception in each of said chambers. The bellows 106 is anchored at one end to the flange 112 as is likewise the bellows 107 to the flange 113. Furthermore, the means 110 is enlarged at 114. This enlarged portion is provided with transverse ducts or bores 115 and 116. These ducts are separately in direct communication with the interior of the bellows. Furthermore, I provide cross ducts which, however, do not intercommunicate, these ducts being substantially diagonal to the part 114 and designated as 117 and 118 respectively. The duct 117 permits communication between the duct 115 and the chamber 109, while the duct 118 is in communication with the duct 116 and the chamber 108. A cap designated generally as 119 is adapted to be bolted or otherwise secured to the flange 102. This cap has the base portion thereof conforming to the general shape of the flange 102 and is provided with two spaced-apart substantially annular flange portions 120 and 121. As both parts of the cap are similarly constructed, one thereof will be described. The annular portion 120 is shouldered and screw-threaded at 122 for reception of an auxiliary screw-threaded cap 123. The part 120 is provided with a bore or port 124. The wall bounding this bore is screw-threaded at 125, whereby a tube may be secured at this portion. The cap is constructed to have an annular member 126 externally threaded at 127. An end of said annular member is formed with an annular knife edge 128 and likewise with an annular shoulder or flange 129. A disc of the type shown in Figure 3 has the base portion thereof resting upon the knife edge and within the confines of the annular shoulder 129. A cap nut 130 is screw-threaded to the threads 127 and has a foot portion 131 bearing against the disc for maintaining the disc in position on the knife edge. It will be noted that when the parts are in assemblage, as just described, that the port 124 is in communication with the interior of the auxiliary screw-threaded cap 123, and likewise communicates with one surface of the disc, as well as communicating with the interior of the bellows 106 through the port 115, and likewise in communication with the chamber 109. So far as the opposite side is concerned, the relationship is just reversed. For convenience of description of operation hereinafter, the port corresponding to the port 124 will be designated as 124a, wherein it will be seen that the port 124a is in communication with the chamber 108 and with the interior of the bellows 107.

As before stated, one end of both bellows is secured to the flanges 112 and 113, respectively. The opposite end of the bellows 106 is anchored in a plate 132, this said plate having secured thereto an arm 133, the arm extending parallel to the longitudinal axis of the bellows and to this arm is secured a further arm 134, the arm 134 being bent to provide two portions at right angles, as shown at 135 and 136. The arm 136 is tapered in form with the end thereof directly beneath and spaced from the center of the disc 24.

The operation, uses and advantages of the two forms of the invention just described are as follows:

First taking the form A; this type of device may be termed a "free-blowing by-pass". Such a device is extremely useful to prevent excessive pressures in a line, whether that being passed through the line be liquid or gaseous in nature. Ordinarily, the conduit 40 would be connected to the up-stream side of the fluid line and the conduit 8 to the down-stream side. It is understood, of course, that an orifice plate may be included within the line with the conduits 8 and 40 on opposite sides of said plate. This is stated by way of illustration. Fluid under pressure will, of course, be received within the chamber of the casing and surround the bellows and be in contact with one surface of the disc, and fluid will likewise be received within the bellows and against the disc. If the pressure on the up-stream should rise, the bellows will tend to contract and the pin 11 will be adjacent the surface of the disc 24. If the pressure becomes excessive, the stem will punch the center of the disc and push the central portion 43 upwardly from the remaining portion of the disc. However, the hinge 42 will hold this portion so that it will not drop within the bellows. The moment this occurs, pressure will be equalized on both the up-stream and down-stream sides of the line. This constitutes one illustration. On the other hand, the device can be used as an atmospheric blow-out, wherein when the disc is broken, the fluid under pressure may escape to the air. If the pressure on the down-stream side should increase over that of the up-stream, the unit pressure which exists on the exterior of the bellows with relation to the pressure within will be such that the bellows will expand and move the member 16 upwardly to where the disc will contact with the pin 35. If the pressure is sufficient, the pin will break the part 43 of the disc although the hinge 42 will prevent said part from dropping within the bellows in the manner as before stated. It will be seen that although the breaking piece may have a strength that will resist very considerable fluid pressures upon both surfaces thereof, it will none the less yield very readily when the same unit pressure acting all over the area of the bellows is concentrated upon the breaking part of the disc by contact of one or the other of the pins 11 or 35 therewith. Thus, in the present instance, the disc would resist pressures much higher than the normal adapted pressure, but through the medium of the bellows, the aggregate of these pressures is sufficient to produce rupture of the disc. I might say that I have certain installations embodying my invention wherein line pressures are as high as 2500 pounds per square inch. I, therefore, feel that I am the first to produce a device of this character wherein the rupture of the breaking piece occurs by mechanical action of the bellows through its distention or contraction under a fluid pressure not in itself sufficient to cause rupture of the breaking piece.

The operation of the form B embodies essentially the principle of the form A, save and except that two breaking pieces or discs are provided. For convenience of description, it may be assumed that the port 124 communicates with the up-stream side of a pressure line, and the port 124a with the down-stream of the pressure line. If the pressure increases on the down-stream over the up-stream side, this pressure is communicated interiorly of the bellows 107 and exteriorly of the bellows 106. In a measure, this pressure is balanced by the up-stream fluid pressure which has entrance within the bellows 106 and within the chamber 109. If the down-stream pressure should exceed the upstream pressure by a material amount, the bellows 107 would be distended and the bellows 106 compressed and if this compression was enough, the arm 136 would be brought into forcible contact with the breaking disc and break out the center thereof. On the other hand, if the up-stream pressure should become excessive, this pressure would cause distention of the bellows 106 and compression of the bellows 107 would in turn cause the arm to break the opposite disc.

In both forms of the invention, the cap nut may be readily removed, to the end that a new breaking disc may be inserted in position, whereupon the cap nut may be replaced. This disc acts as a positive seal. It is not subject to leakage for several reasons, to wit: The knife edge acts to impress itself within the soft metal of the disc so that a positive fluid seal occurs at this zone when the cap nut is tightened against the opposite surface of the disc. Thus, the disc is positive in holding fluid under pressure. It is also apparent why the cap or cover for the casing is made in two parts; to the end that one of the said parts may be readily removed for access to the cap nuts or nuts holding the disc. In actual practice, it has been found that only a few minutes of time is required to remove the disc and replace it with a new one.

In the form A, the disc breaking pins may be readily adjusted to space the same from the disc. The auxiliary springs, of course, permit for nicety of adjustment and, as before stated, are necessary when the bellows does not have sufficient resilient resistance or any inherent resiliency of its own. In this particular, it will be observed that the pins 11 and 35 are stationary and that the bellows along with the member 16 is movable, and which member 16 carries the disc. I have not shown any adjustable means for the arm 134 for the form of the invention B, but it is apparent that adjustment may be provided.

It is obvious that various changes and modifications and variations may be made in practicing the invention in departure from the particular showing of the drawings without departing from the true spirit of the invention.

I claim:

1. In a fluid pressure relief device, a bellows, a frangible member normally closing communication with the interior of said bellows, separate means whereby fluid pressure may be maintained both within and exterior said bellows, and means whereby said frangible member is broken to equalize fluid pressure both externally and internally the bellows through distention and compression of said bellows when a differential external-internal fluid pressure beyond a selected predetermined maximum is reached.

2. In a fluid pressure relief means, a disc formed with an interrupted groove, the interrupted portion of the groove forming a hinge, whereby when a portion of said disc bounded by said groove is struck, the portion may be moved relative to the remaining portion of the disc, the interrupted portion acting as a hinge.

3. In a fluid pressure relief means, a casing, a bellows within said casing, means of fluid access within said bellows, and means of fluid access within said casing to surround said bellows, a frangible disc closing entrance between the interior of the casing and said bellows, and means whereby when the bellows moves beyond a selected maximum, said frangible disc is broken to permit communication between the fluids within the bellows and exteriorly thereof.

4. In a fluid pressure relief means, a casing, a bellows within said casing, means of fluid access for the interior of said bellows, a frangible disc closing said bellows against escape of said fluid therein, means of fluid access within the casing to surround said bellows, said frangible disc being of sufficient strength to withstand a selected differential external and internal fluid pressure thereagainst, and mechanical means adapted to break said frangible member due to distention or compression of said bellows under a differential fluid pressure not in itself sufficient to cause rupture of the frangible member.

5. In a device of the character disclosed, a casing provided with a cap, a pin carried by the casing and a pin carried by the cap both in axial alignment and spaced apart, a bellows secured at one end to the casing, the opposite end carrying a frangible disc controlling entrance within the bellows; said frangible disc being interposed between ends of said pins; separate means whereby a fluid under pressure may be admitted within the bellows and a fluid under pressure within the casing and surrounding the bellows; distention or compression of said bellows under fluid pressure difference being adapted to move said frangible member toward one or the other of said pins, excess fluid pressure difference causing rupture of said disc due to movement of the said bellows.

GEORGE S. BINCKLEY.